A. G. LAMB.
UNIVERSAL JOINT.
APPLICATION FILED SEPT. 9, 1912.
1,122,953.
Patented Dec. 29, 1914.
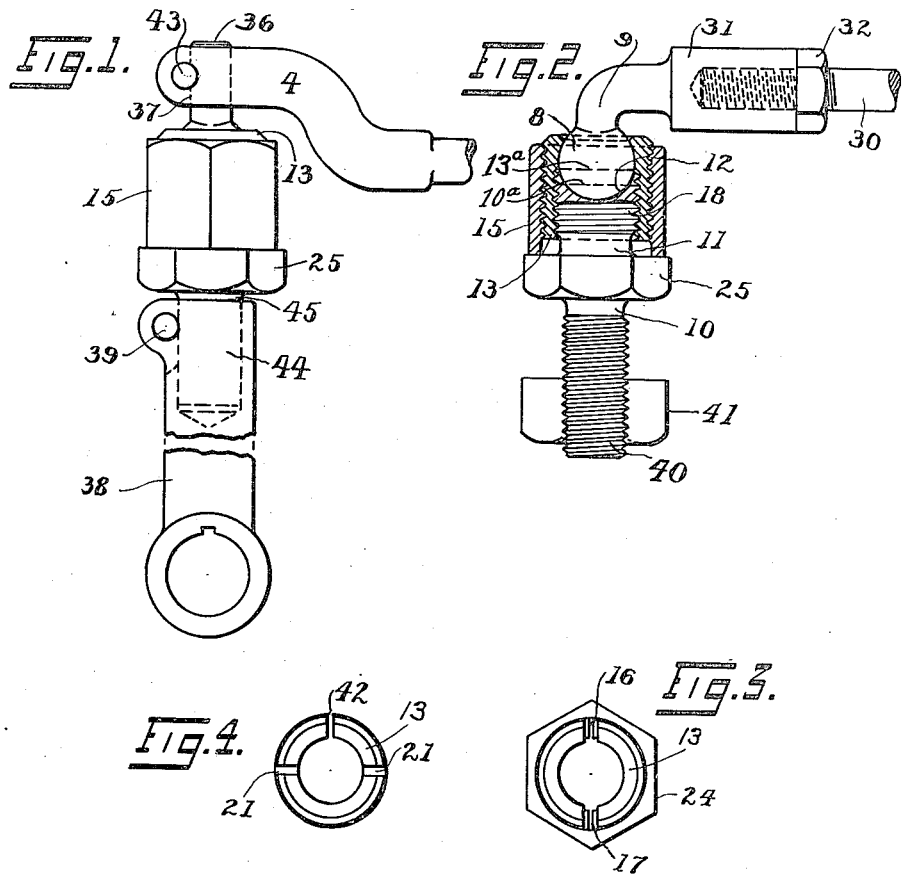
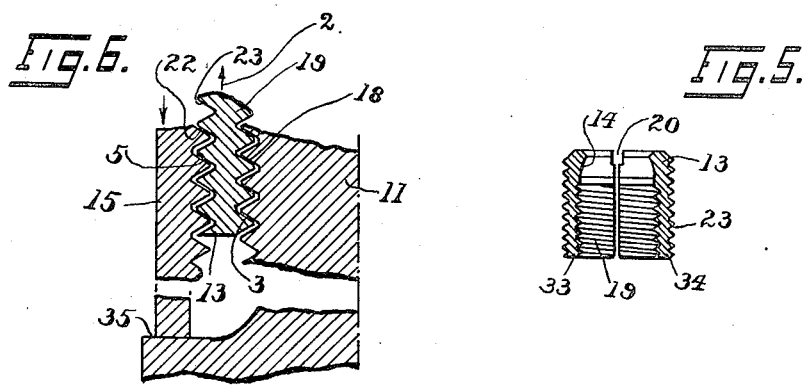
Witnesses:
Chas. E. Whitman
H. D. Penney
Inventor:
Amherst G. Lamb.
By his Attorney, F. H. Richards.

UNITED STATES PATENT OFFICE.

AMHERST G. LAMB, OF TORRINGTON, CONNECTICUT.

UNIVERSAL JOINT.

1,122,953.  Specification of Letters Patent.  Patented Dec. 29, 1914.

Application filed September 9, 1912. Serial No. 719,430.

*To all whom it may concern:*

Be it known that I, AMHERST G. LAMB, a citizen of the United States, residing in Torrington, in the county of Litchfield and State of Connecticut, have invented certain new and useful Improvements in Universal Joints, of which the following is a specification.

My invention discloses the correct use of the elasticity of metal in universal (ball-and-socket) joints to make them satisfactory in operation and as durable as possible with our present technique. In nature such joints comprise two bones one terminating in a ball, the other containing a socket; an elastic ligament limiting the play of the bones and a synovial gland to oil them; and hitherto, in art, man has imitated nature and used metal without pausing to discover, by analysis, the best mode of utilizing its qualities.

The only changes have been the use of metal, substitution of a tubular nut or union for the ligament and generally, omission of automatic oiling; except for wrist-pin joints, in which the ligament is replaced by a strap or yoke union and the socket is annular and divided. Joints so constructed can be satisfactory where the stress and strain are never reversed because in such uses the ball is always pressed in one general direction into its socket, axial play under load cannot occur and the behavior of the union does not affect work-transmission. But for transmitting reciprocation and stresses alternating in their general directions, such joints are apt to either bind, rattle or knock and are unsatisfactory and short-lived; and scientific adjustment of their fit and play to their uses is impossible, and must be left largely to chance; all because of the alternation, in the union, of compression and tensional elongation. All such defects are remedied in my invention whose characteristics are: two work-transmitting members adapted to be connected by a ball and socket and, connecting them, an adjustable, plural-membered union adapted to utilize the elastic reaction of metal against strain to enable the user to cause and to make permanent in the joint (save as altered by wear) and entirely unaffected by the heaviest work, the fit and play most suitable for its user, so that it will neither bind, rattle nor knock. In the form illustrated the union acts parallel with the axis of stress and comprises a tension member which envelops the bulb and directly connects the two abutments of the socket, and thereby the two work members; and an adjusting distender which is a compression cushion interposed between said tension member and one abutment of the socket and is adapted, when itself strained in compression, to cause a balancing tensional strain in said tension member and extend it and distend the joint by separating the socket abutments a distance gaged by the dimensions and moduli of the elasticity of the tensional member and distender, and by the initial unit stress caused by adjustment.

If said initial stress be so great as to induce in said members strains considerably greater than would be caused by the greatest possible working stress, if they were strain-free, the working stresses cause no change whatever in the relations of the union and socket abutments and the fit and play will be entirely unaffected (save by wear) under all work conditions. In practice, the joint is adjusted by screwing the tension member home hard enough to cause in it the tension which knowledge dictates; and then screwing home the distender until feeling reveals the proper fit and play in the joint.

It will be seen that my invention consists in a union adapted to apply to ball-and-socket joints the principle of limited stability due to the equilibrium of opposite forces (in this case elastic reactions) each exceeding the maximum force to which the mechanism can be subjected in its uses.

In the accompanying drawing, showing one embodiment of my invention, Figure 1 is a side elevation; Fig. 2 is an axial section, some parts being shown in elevation; Fig. 3 is an end view of the device with the ball member omitted; Fig. 4 is an end view of the sleeve member having one divisional cut; Fig. 5 is a section through the sleeve; and, Fig. 6 is a fragmentary view, enlarged, of some of the members.

The device is shown as comprising a ball member having a ball 8 and a stem 9, which ball is adapted to engage a work member 10 provided with a stem 11 having at the end a face 12 preferably, but not necessarily corresponding in curvature to the ball 8, that engages the ball at its end portion, that is, the portion opposite the stem 9. The face 12 can be made a hollow cone or a plane, without materially impairing the efficiency or durability of the joint.

To retain the ball seated on the end face of the stem of the work member, I provide a sleeve member 13 of a size to fit on the stem 11 and provided with means for being adjustably secured on the stem. The sleeve 13 at one end has an internal concave annular face 14 preferably corresponding in curvature to that of the ball (but which may be conical or plane), and its opening at this end is smaller than the stem 11, whereby it can engage the ball around the stem to press the ball into engagement with the end of the stem, and retain the ball seated thereon, when the sleeve is properly secured on the stem.

I further provide a distender, shown in the form of a sleeve 15, whose principal function is to enable the user to establish and make permanent in the joint (save for wear) the fit and play best suited to its uses by manipulating said distender so as to cause it to act as a compression cushion between the stem 10 and the sleeve 13 (that is to say, between the two socket-abutments or bearing faces of the joint) and to properly and permanently distend the joint by setting up in said distender and sleeve respectively, equal initial compressive and tensile strains and elastic reactions thereagainst, acting parallel with the axis of stress and each considerably exceeding the greatest strain which would be caused in said members, if strain-free, by the heaviest work to which the joint is liable. Further functions of said distender are to lock the bearing sleeve 13 in its adjusted position on the stem 11, and to embrace the sleeve and form a strong support for the same, which is of especial advantage when the sleeve is provided with a longitudinal division, as at 42, in Fig. 4, or two longitudinal divisions, as at 16 and 17 in Fig. 3, whereby the sleeve is divided into two portions.

The means shown for adjustably securing the intermediate sleeve 13 on the stem, comprises a screw thread engagement, the stem being provided with threads 18, and the sleeve having a threaded bore 19 to turn on the stem, thereby adjusting the sleeve longitudinally on the stem. This provides the proper adjustment between the said curved engaging faces of the ball, with the stem, and with the annular bearing sleeve. To facilitate this adjustment, sockets may be provided to engage with a suitable spanner, such as is shown at 20 in Fig. 5, or at 21, Fig. 4.

The distender 15 is shown as having its bore internally threaded as at 22, and the sleeve 13 is externally threaded as shown at 23, whereby the distender is adjustable longitudinally on the sleeve 13; and the distender may have its outer face of hexagonal shape, as shown at 24, or otherwise formed, to be turned by a wrench or like means.

The work member 10, is shown as also provided with a flange or shoulder 25, which is an abutment for the distender 15. When the joint is assembled the sleeve 13 is screwed down upon the ball 8 until the proper tension is caused in said sleeve, whereupon the distender 15 is screwed upon said sleeve against the shoulder 25 until feeling reveals the proper fit and play in the joint; and said fit and play will be permanent, save for wear.

When properly adjusted, the joint is characterized by stability, which is permanent relatively to the maximum working stress and due to opposite, balanced elastic reactions, parallel with the axis of stress, in the distender and sleeve. The distender acts in compression, as a cushion, causes balancing tension in the sleeve and properly and permanently distends the socket. The play in such a joint must be very slight, merely enough to make sure that the ball will never bind. To facilitate securing the proper play, the two sockets of the joint are separated by a determined distance, as indicated by the dotted lines 10$^a$ and 13$^a$, Fig. 2. Suppose this distance to be one-eighth of an inch, the material to be alloy steel with undulus of elasticity 28000000, elastic limit 150000, and unit strain 112000, all in pounds per square inch; then the distention by adjustment of the lines 10$^a$ and 13$^a$ would be $$\frac{112000}{28000000 \times 8} = \frac{1}{2000}.$$

It is obvious that the distender 15 also acts as a lock to prevent the sleeve 13 from accidentally backing out.

One of the advantages which I obtain by means of my present improvement, is that the two opposing bearing-zones comprising the middle concave bearing face 12, Fig. 2, of the stem, and the annular concave face 14, are located on members which are subjected to stress by the surrounding closing member in the same direction in which the working strain upon the bearing surfaces normally tends to move the said bearing members. For instance, as will be seen by a comparison of the said members as shown in the sectional view, Fig. 2, and of the stresses which occur therein as indicated by the arrows in Fig. 6, any working stress between the ball and either of the said bearing faces 14 and 12 will normally tend to force the annular member 13 (having the annular bearing face 14) outwardly from the said central bearing face 12 which is on the end of the central threaded stem 11. If an external force be applied to the said annular bearing member 13 in the direction indicated by the arrow 2 in said sectional view, Fig. 6, it will be evident that the interlocking screw threads, as 19 on the inside of said annular member and the threads 18 on the outside of said stem, will necessarily come into engagement on the rearward side of the said central thread and on the forward side of the said thread 19 of said annular member.

The above noted feature I have illustrated in the enlarged diagrammatic view given in Fig. 6, in which the said inner thread 19 is shown contacting on its forward side at 3 with the rearward side of the said thread 18 of the stem 11. Fig. 6 also illustrates the co-action with the foregoing features of the external thread 23 of said annular bearing member 13 with the abutment face 35, and the intervening distender 15, by means of which all of the parts, when properly adjusted, are held in a rigid combination in proper working condition.

The said intervening distender 15 sets, or is itself bearing, against the forward face or abutment 35 of shoulder 25 on the stem, and has an internal thread, as 22, Fig. 6, engaging with the corresponding external thread 23 of said annular bearing member 13. The effect of this arrangement, as will now be obvious by a comparison of the several figures of the drawing, including said diagrammatic Fig. 6, is such that when the annular member is turned upon the central stem 11 to the point of properly adjusting the fit or pressure thereof upon the ball journal 8, then by screwing down said distender 15 to bear firmly upon the abutment face 25, the forward side of the thread 22 within said distender bears against the downward side of the corresponding thread 23 on the exterior of said annular bearing member, as indicated, for instance, at the point 5 in the said Fig. 6. The immediate effect of this manner of adjusting the annular member, as will now be evident, is to put upon said annular member a stress tending to move the same away from the abutment face 25 and into a firm engagement with the central stem 11, this movement, or tendency of movement, being in the direction for separating the bearing faces 12 and 14, thereby to loosen the actual fit or pressure of these bearing faces upon the ball 8 which constitutes the journal operating in connection with the adjustable bearing. By this means an extreme firmness of adjustment is obtained and the several co-acting parts of the socket are brought into a state of intense stress whereby the bearing acquires, through being adjusted ready for use, a high degree of initial resistance, so that in practice, when the usual working stresses are applied they do not operate to flex or impair the adjustment of the fit and play of the joint, because they cannot increase the initial strains, being themselves less than the stresses which caused said initial strains.

In some cases it is important to make the journal member curved in the manner indicated in Fig. 2, in which case the operating connection therefor and thereof may be arranged as also indicated in said Fig. 2, in which some suitable operating rod, as 30, is shown screwed into the threaded bore of the extension 31 of said stem 9 of the journal member, a check nut as 32, being provided, if desired, for retaining the said parts in their properly adjusted position. When the said journal member is arranged as here set forth, obviously it cannot pass through the annular member 13 unless it be divided, and for this reason, among others, the said member is shown in Fig. 3 to be entirely divided, although it continues to act in the assembled connector as a single annular bearing member so far as concerns the adjustment. When the annular bearing member 13 is thus constructed in two parts, as 33 and 34, Fig. 5, these parts may be placed over the spherical journal 8 and then this annular member screwed into the distender 15 nearly to the proper working position, after which the central stem may be screwed into the annular member and the several parts thus brought to approximately their proper working positions. When this is accomplished, the said annular member may be adjusted after the manner of turning a tubular screw upon the stem 11, and within the distender 15, until the fit or pressure from the spherical journal is slightly in excess of that which is desired for the proper working condition of the same, whereupon by means of suitable wrenches or the like, the distender 15 should be brought back firmly against its abutment face 25 for thereby putting all of the said parts under the required stress, and thereby make the connector ready for use.

As shown in Fig. 2, the stem 9 of the ball member 8 is bent at right angles to the axis of the work member 10, which arrangement is used with the intermediate sleeve 13 made in sections, to admit the insertion of the bent stem. But where the sleeve is not divided the stem is made straight, as 36, Fig. 1, that enter a socket 37 in a lever 4 and may be secured therein by a pin 43. When the several parts have been assembled in substantially the manner above outlined, it will be seen that all of the strains which occur within and between the several members of this adjustable bearing, tend to effect a movement of the parts in the direction in which the working stresses would normally cause a similar tendency of movement, these tendencies, however, being positively limited practically at zero by reason of the intensity of the stress which can be obtained by means of the peculiar organization and method of adjustment which I have herein described.

For convenience in operating the distender 15 relatively to the central stem, the exterior surface of this closing member may be of a hexagonal or other suitable shape for engaging with a suitable wrench or spanner, and the abutment member 25 of the central stem may also be similarly formed for a like purpose, so that by using a pair of wrenches or like implements in a well known manner, the necessary adjustment may be made and all the threaded members be firmly set in their proper positions with the required degree of firmness for resisting the working forces and the intense vibrations met with in the automobile, and other mechanisms.

In practice, the central member 10 may have any suitable extension, as for instance, the bolt 40, whereby to apply the same to a working member of a mechanism; or said central stem, together with its abutment face, may be formed and constitute a part of a lever arm, or other working member of the mechanical device to which the connector is to be applied. In practice, however, and for reasons of convenience, I prefer to make the said central member with a bolt or threaded stem 40, with a nut, as 41, in a well known manner.

In Fig. 1, the stem 45 is shown as entering a socket 44 in a member 38, and secured by a binding screw 39.

Having thus described my invention, I claim:—

1. In a ball joint, a ball member, a work member comprising a threaded stem having a face adapted to engage the ball, a sleeve internally threaded to screw on the threaded stem and having an internal face engaging the ball member to retain it seated on the stem, the sleeve being divided longitudinally, and a distending second sleeve in engagement with the outer face of the first sleeve and also engaging the work member and adjustable on one of said two members to effect a stress on the first sleeve in an outward direction from the stem to lock it in adjusted positions thereon.

2. In a ball joint, a ball member, a work member comprising a stem having a face adapted to engage the ball, a sleeve member adjustably engaging the stem and having an internal face engaging the ball to retain it seated on the stem, said sleeve being divided longitudinally, and a second sleeve in engagement with the outer face of the first sleeve and also engaging the work member and adjustable on one of said two members to effect a stress on the first sleeve in an outward direction from the stem to lock it in adjusted positions thereon.

3. In a ball joint, a ball member, a work member comprising a stem having a face adapted to engage the ball, a sleeve externally threaded and adjustably engaging the stem and having an internal face engaging the ball member to retain it seated on the stem face, the sleeve being divided longitudinally, the work member having a shoulder, and a second sleeve internally threaded to screw on the said first sleeve and engaging said shoulder by one end to lock the first sleeve in adjusted positions on the stem.

4. In a ball joint, a ball member, a work member comprising a threaded stem having a face adapted to engage the ball, a sleeve externally threaded and also internally threaded to screw on the threaded stem and having an internal face engaging the ball member to retain it seated on the stem face, said sleeve being divided longitudinally, the work member having a shoulder, and a distending second sleeve internally threaded to screw on the said first sleeve and engaging said shoulder by one end to lock the first sleeve in adjusted positions on the stem.

5. In a ball joint, a ball member, a work member comprising a threaded stem having a face adapted to engage the ball, a sleeve internally threaded to screw on the threaded stem and having an internal face engaging the ball member to retain it seated on the stem face, the sleeve being divided longitudinally, and a distending second sleeve embracing the divided sleeve member and arranged to lock the first sleeve in adjusted positions on the stem.

AMHERST G. LAMB.

Witnesses:
  JAS. E. MALLETT,
  L. B. SPEED.